US008275795B2

(12) United States Patent
Carbajales et al.

(10) Patent No.: US 8,275,795 B2
(45) Date of Patent: *Sep. 25, 2012

(54) MODEL EXTENSION FRAMEWORK

(75) Inventors: Sebastian Carbajales, Toronto (CA); Vladimir Klicnik, Oshawa (CA); Lok Tin Loi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,718

(22) Filed: Feb. 1, 2012

(65) Prior Publication Data

US 2012/0131544 A1    May 24, 2012

Related U.S. Application Data

(63) Continuation of application No. 10/971,480, filed on Oct. 22, 2004, now Pat. No. 8,185,555.

(51) Int. Cl.
*G06F 7/00* (2006.01)
*G06F 17/30* (2006.01)

(52) U.S. Cl. ...................................................... 707/793
(58) Field of Classification Search ............................. None
See application file for complete search history.

(56) References Cited

U.S. PATENT DOCUMENTS

| | | | |
|---|---|---|---|
| 5,581,769 A | 12/1996 | Wallace et al. | |
| 5,649,200 A | 7/1997 | Leblang et al. | |
| 5,745,905 A | 4/1998 | Larsson et al. | |
| 6,008,806 A | 12/1999 | Nakajima et al. | |
| 6,112,024 A | 8/2000 | Almond et al. | |
| 6,324,544 B1 | 11/2001 | Alam et al. | |
| 6,360,230 B1 | 3/2002 | Chan et al. | |
| 6,430,703 B1 | 8/2002 | Connor et al. | |
| 6,442,748 B1 | 8/2002 | Bowman-Amuah | |
| 6,460,089 B1 | 10/2002 | Romano et al. | |
| 6,611,844 B1 | 8/2003 | Saulpaugh et al. | |
| 6,633,924 B1 | 10/2003 | Wu et al. | |
| 6,704,804 B1 | 3/2004 | Wilson et al. | |
| 6,732,111 B2 | 5/2004 | Brodersen et al. | |
| 6,732,124 B1 | 5/2004 | Koseki et al. | |
| 6,829,617 B2 | 12/2004 | Sawdon et al. | |
| 6,947,967 B2 | 9/2005 | Ferris et al. | |
| 6,959,310 B2 | 10/2005 | Eshel et al. | |
| 7,096,465 B1 | 8/2006 | Dardinski et al. | |
| 7,272,815 B1 | 9/2007 | Eldridge et al. | |
| 7,275,063 B2 | 9/2007 | Horn | |
| 8,185,555 B2 | 5/2012 | Carbajales et al. | |
| 2002/0078256 A1 | 6/2002 | Gehman et al. | |
| 2002/0085020 A1 | 7/2002 | Carroll | |
| 2002/0194382 A1 | 12/2002 | Kausik et al. | |
| 2003/0037181 A1 | 2/2003 | Freed | |

(Continued)

OTHER PUBLICATIONS

Carey et al., "XPERANTO: Publishing Object-Relational Data as XML", Proceedings of the 3rd International Workshop on the Web and Databases, WEBDB 2000, pp. 105-110, ACM, 2000.*

(Continued)

*Primary Examiner* — Michael Hicks
(74) *Attorney, Agent, or Firm* — Marcia L. Doubet

(57) ABSTRACT

Techniques for implicitly extending an object model, even those that do not provide an extension mechanism, in a manner that is transparent, independent, and non-disruptive to the model itself. An "extension" is preferably created for each object to be extended, and comprises a reference to the object and contains an "extension object" that specifies the particular extensions.

6 Claims, 10 Drawing Sheets

U.S. PATENT DOCUMENTS

| | | |
|---|---|---|
| 2003/0061398 A1 | 3/2003 | Wilson et al. |
| 2003/0093402 A1 | 5/2003 | Upton |
| 2003/0110312 A1 | 6/2003 | Gunduc et al. |
| 2004/0006651 A1 | 1/2004 | Dani et al. |
| 2005/0008163 A1 | 1/2005 | Leser et al. |
| 2006/0101091 A1 | 5/2006 | Carbajales et al. |
| 2006/0101445 A1 | 5/2006 | Carbajales et al. |

OTHER PUBLICATIONS

Stojanovic et al., "Modeling and Querying Mobile Objects in Location-Based Services", Scientific Journal Facta Universitatis—Series Mathematics and Informatics, vol. 18, pp. 59-80, 2003.*

Sebastian Carbajales, et al., U.S. Appl. No. 10/972,226, filed Oct. 22, 2004, Office Action, Sep. 13, 2007, 15 pages.

Sebastian Carbajales, et al., U.S. Appl. No. 10/972,226, filed Oct. 22, 2004, Office Action, Jun. 5, 2008, 20 pages.

Sebastian Carbajales, et al., U.S. Appl. No. 10/972,226, filed Oct. 22, 2004, Advisory Action, Sep. 8, 2008, 3 pages.

Sebastian Carbajales, et al., U.S. Appl. No. 10/972,226, filed Oct. 22, 2004, Pre-Appeal Brief Conference Decision, Oct. 24, 2008, 3 pages.

Sebastian Carbajales, et al., U.S. Appl. No. 10/972,226, filed Oct. 22, 2004, Office Action, Dec. 26, 2008, 12 pages.

Sebastian Carbajales, et al., U.S. Appl. No. 10/972,226, filed Oct. 22, 2004, Examiner's Interview Summary, Jun. 10, 2009, 1 page.

Sebastian Carbajales, et al., U.S. Appl. No. 10/972,226, filed Oct. 22, 2004, Notice of Allowance, Jun. 10, 2009, 19 pages.

Sebastian Carbajales, et al., U.S. Appl. No. 10/972,226, filed Oct. 22, 2004, Notice of Abandonment, Oct. 7, 2009, 1 page.

"EMF Documents: The EMF.Edit Framework Overview", Eclipse Tools, Internet-published article, Last updated Jun. 1, 2004, printed Jul. 7, 2004, <http://download.eclipse.org/tools/emf/scripts/docs.php?doc=references/overview/EMF.Edit.html>, (19 pages).

"EMF", Eclipse Tools, Internet-published article, published date unknown, printed Jul. 7, 2004, <http://download.eclipse.org/tools/emf/scripts/home.php>, (2 pages).

"EMF Documents: The Eclipse Modeling Framework (EMF) Overview", Eclipse Tools, Internet-published article, Last updated Jun. 1, 2004, printed Jul. 7, 2004, <http//download.eclipse.org/tools/emf/scripts/docs.php?doc=references/overview/EMF.html>, (19 pages).

Carey, et al., XPERANTO: Publishing Object-Relational Data as XML, Proceedings of the 3rd International Workshop on the Web and Databases, WEBDB 2000, pp. 105-110, ACM, 2000.

Tony Ng, "Using Histories to Implement Atomic Objects", ACM Transactions on Computer Systems, vol. 7, No. 4, Nov. 1989, pp. 360-393.

Sebastian Carbajales, et al., U.S. Appl. No. 10/971,480, filed Oct. 22, 2004, Office Action, May 21, 2007, 9 pages.

Sebastian Carbajales, et al., U.S. Appl. No. 10/971,480, filed Oct. 22, 2004, Office Action, Sep. 28, 2007, 12 pages.

Sebastian Carbajales, et al., U.S. Appl. No. 10/971,480, filed Oct. 22, 2004, Advisory Action, Dec. 21, 2007, 3 pages.

Sebastian Carbajales, et al., U.S. Appl. No. 10/971,480, filed Oct. 22, 2004, Office Action, May 5, 2008, 14 pages.

Sebastian Carbajales, et al., U.S. Appl. No. 10/971,480, filed Oct. 22, 2004, Office Action, Jul. 22, 2008, 12 pages.

Sebastian Carbajales, et al., U.S. Appl. No. 10/971,480, filed Oct. 22, 2004, Preliminary Appeal Brief Conference Decision, Nov. 6, 2008, 2 pages.

Sebastian Carbajales, et al., U.S. Appl. No. 10/971,480, filed Oct. 22, 2004, Examiner's Answer, Mar. 2, 2009, 15 pages.

Sebastian Carbajales, et al., U.S. Appl. No. 10/971,480, filed Oct. 22, 2004, Appeal Docketing Notice, Jul. 13, 2009, 2 pages.

Sebastian Carbajales, et al., U.S. Appl. No. 10/971,480, filed Oct. 22, 2004, BPAI Decision, Dec. 19, 2011, 6 pages.

Sebastian Carbajales, et al., U.S. Appl. No. 10/971,480, filed Oct. 22, 2004, Notice of Allowance, Jan. 17, 2012, 8 pages.

* cited by examiner

```xml
<?xml version="1.0" encoding="UTF-8"?>
<schema targetNamespace="http:///car.model/carModel.xsd"
  xmlns:cm="http:///car.model/carModel.xsd"
  xmlns="http://www.w3.org/2001/XMLSchema">

<element name="Car" type="cm:tCar"/>
```

210
```xml
  <complexType name="tCar">
    <sequence>
      <element name="Engine" type="cm:Engine"/>
      <element name="Body" type="cm:Body"/>
      <element name="Chassis" type="cm:Chassis"/>
    </sequence>
  </complexType>
```

```xml
  <complexType name="Engine"/>
```

220
```xml
  <complexType name="Body">
    <sequence>
      <element name="Hood" type="cm:Hood"/>
      <element name="Door" type="cm:Door" minOccurs="2"
                                          maxOccurs="4"/>
    </sequence>
  </complexType>
```

```xml
  <complexType name="Hood"/>

<complexType name="Door"/>
```

```
230    <complexType name="Chassis">
           <sequence>
               <element name="Wheel" type="cm:Wheel" minOccurs="3"
                                                     maxOccurs="4"/>
           </sequence>
       </complexType>

240    <complexType name="Wheel">
           <sequence>
               <element name="Tire" type="cm:Tire"/>
               <element name="Rim" type="cm:Rim"/>
           </sequence>
       </complexType>

<complexType name="Tire"/>

<complexType name="Rim"/>

</schema>
```

FIG. 6 new2004design.carmodel

_600_

```xml
<?xml version="1.0" encoding="ASCII"?>
<cm:TCar xmi:version="2.0" xmlns:xmi="http://www.omg.org/XMI"
    xmlns:cm="http:///car.model/carModel.xsd">
  <body>
    <hood/>
  </body>
  <chassis/>
</cm:TCar>
```

FIG. 7 new2004design.uiextension

700

```xml
<?xml version="1.0" encoding="ASCII"?>
<extensionmodel:ExtensionMap xmi:version="2.0"
    xmlns:xmi="http://www.omg.org/XMI"
    xmlns:xsi="http://www.w3.org/2001/XMLSchema-instance"
    xmlns:extensionmodel="http:///extensionmodel.ecore"
    xmlns:uiextensionmodel="http:///uiextensionmodel.ecore"
    namespace="http://car.model/new2004design">
```
← 701

710
```xml
  <extensions>
    <extendedObject href="new2004design.carmodel#//@body"/>      ← 711
    <extensionObject xsi:type="uiextensionmodel:UIExtension" x="10" y="20"/>
  </extensions>
```

```xml
  <extensions>
    <extendedObject href="new2004design.carmodel#//@body/@hood"/>   ← 721
    <extensionObject xsi:type="uiextensionmodel:UIExtension" x="55" y="55"/>
  </extensions>

<extensions>
    <extendedObject href="new2004design.carmodel#//@chassis"/>
    <extensionObject xsi:type="uiextensionmodel:UIExtension" x="31" y="42"/>
  </extensions>

</extensionmodel:ExtensionMap>
```

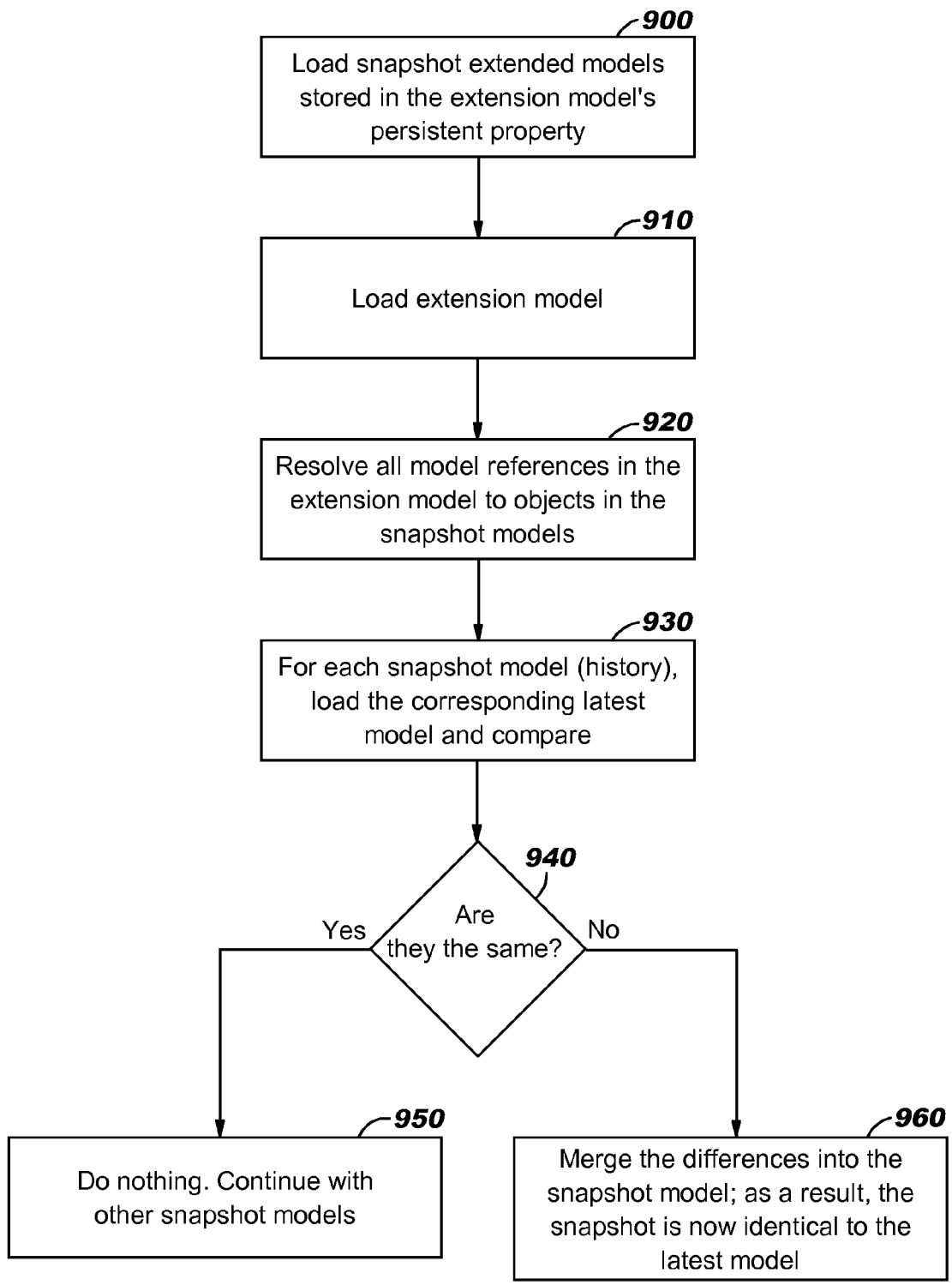

MODEL EXTENSION FRAMEWORK

CROSS REFERENCE TO RELATED APPLICATIONS

The present application is a Continuation of commonly-assigned and co-pending U.S. patent application Ser. No. 10/971,480, which was filed on Oct. 22, 2004. The present application is related to commonly-assigned U.S. patent application Ser. No. 10/972,226 (also filed on Oct. 22, 2004), which is titled "Recovering References in an Extended Model" (referred to hereinafter as "the related application").

BACKGROUND

1. Field of the Invention

The present invention relates to computer programming, and deals more particularly with extending a model in a manner that is transparent to the model being extended.

2. Description of the Related Art

Object-oriented models can be expressed generally as a group of class diagrams, collaboration diagrams, state diagrams, etc. A modeling notation such as the well-known Unified Modeling Language ("UML") may be used to describe the model. Once a model is created, it is possible to represent it in a programming language such as the Java™ programming language. ("Java" is a trademark of Sun Microsystems, Inc.) The instance of the model then becomes available as a programming tool.

Some models provide an extension framework. This means that the user can augment the model with one or more new objects (or a new model entirely) not defined in the original specification, as long as they conform to certain constraints set forth by the model. An example of this is the Web Services Description Language ("WSDL") model. WSDL is a well-known language for describing network-accessible services. The WSDL model provides an extension framework where an "ExtensibleElement" (i.e., an element defined in the WSDL, or extended, model) can be extended by an "ExtensibilityElement" (where this element is implemented by the extending model). This constraint is somewhat limiting because the objects in the extending model need to implement the "ExtensibilityElement" interface, and therefore create a dependency on the extended model. This dependency prevents a model extension from being reusable when extending other models. Also, the extension framework must be explicitly provided by the model in order for other models to "plug in" to it.

BRIEF SUMMARY

The present invention, referred to herein as the "Model Extension Framework" or "MEF", defines techniques for implicitly extending any model, even those that do not provide an extension mechanism.

In one aspect, addressed in the present application, techniques are provided for indirectly extending a model in a manner that is transparent to the model itself. An "extension" is preferably created for each object to be extended, where this extension comprises a reference to the object and contains an "extension object" that specifies the particular extensions. The extended model is not disrupted, since in preferred embodiments, the extension and extension object are maintained and stored independently from the extended object. The extended model itself (i.e., the model which is extended) therefore remains unchanged.

In another aspect, addressed in the related application, techniques are provided for programmatically recovering broken references between a model and corresponding extensions. This aspect preferably comprises persisting a snapshot of each extended model, along with the extensions to the model, where the extensions reference objects in the snapshot. Upon subsequently reloading the object model, the snapshot is compared to a current version of the object model. If the snapshot does not match this current version, the snapshot is preferably revised using a merge operation, bringing the snapshot into alignment with the current version. The extensions then refer to the correct objects.

The present invention will now be described with reference to the following drawings, in which like reference numbers denote the same element throughout.

BRIEF DESCRIPTION OF THE SEVERAL VIEWS OF THE DRAWINGS

FIGS. 2A-2B provide a sample schema for an example used to illustrate preferred embodiments of the present invention.

FIGS. 6 and 7 depict serialized resource content corresponding to the sample models; and FIGS. 8-9 provides flowcharts depicting logic which may be used when implementing a preferred embodiment of the present invention.

DETAILED DESCRIPTION

Figure 1:
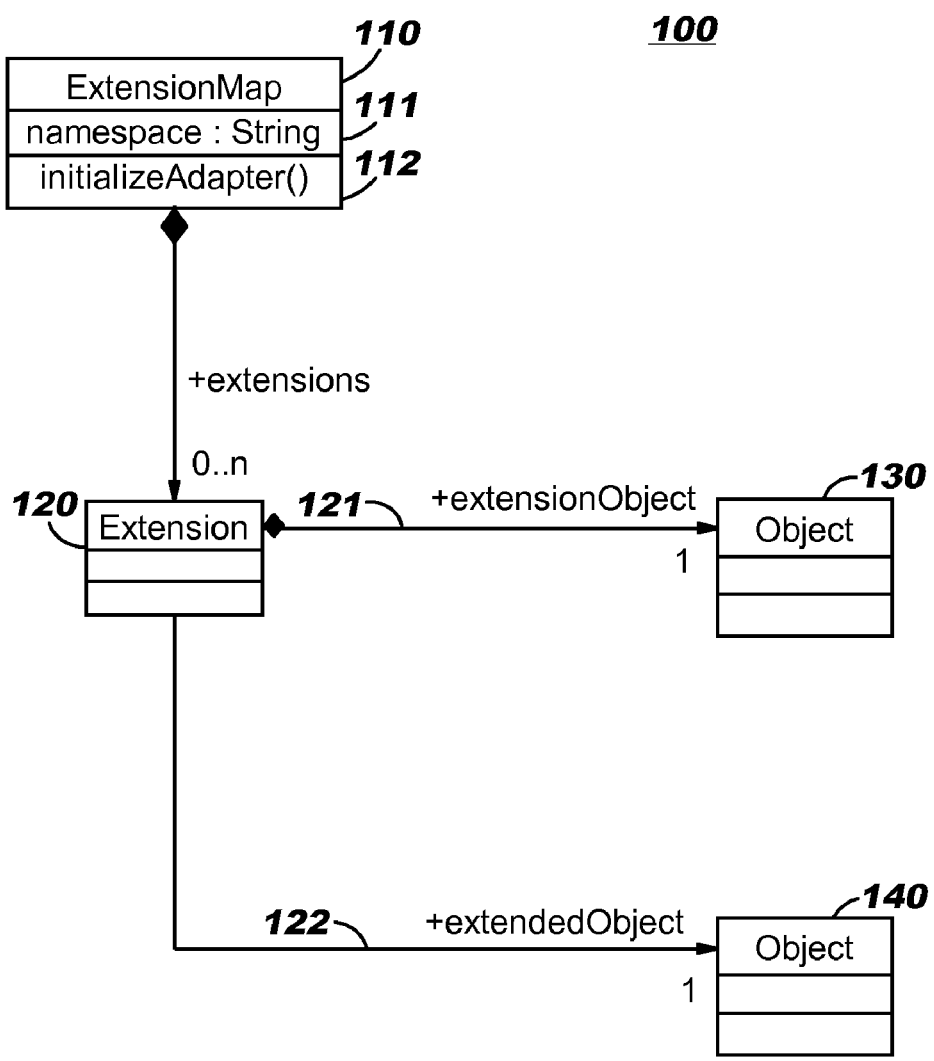
FIG. 1 provides a class diagram describing the MEF, according to preferred embodiments.

Preferred embodiments of the present invention allow the indirect extension of an object model. In other words, embodiments of the present invention provide for extending a model (referred to herein as the "extended model") without actually having to modify the structure or content of that model.

Suppose, for example, that a developer is working with a language such as WSDL or Business Process Execution Language for Web Services ("BPEL"), for which a model is defined. Further suppose that the developer is using a graphical user interface ("GUI") to visually compose objects of this model, and that as the developer drags and drops icons representing the objects, the underlying editor needs to keep track of the current position of the model object on the canvas. To do this, the editor maintains the (x,y) coordinates of each object. Once the model is persisted to disk, these (x,y) coordinates must be saved somewhere so that when the model is reloaded, the layout in the canvas can be restored. However, the language model is not defined to include (x,y) coordinates of an object's location on a GUI canvas. Since the language model does not provide a facility to store this UI information, the problem then becomes how to persist this information (and thereby enable the subsequently-reloaded model to reflect the developer's composition). Because WSDL is extensible, the WSDL model could be modified to include this information; however, the model then includes information that is not actually pertinent to the underlying network-accessible service. And when the model being edited is not extensible, the prior art offers no solution. Furthermore, using the built-in ExtensibilityElement feature of WSDL to define extensions, according to the prior art, ties those extensions to the WSDL model, such that they are dependent upon that model and cannot be reused with other models. The present invention resolves these problems.

According to preferred embodiments, the implicit extension of a model is made possible by the fact that the MEF (i.e., a mechanism comprising extension information as disclosed herein) can be stored in a separate resource (from the extended model) without building a reference to it in the extended model. (The term "resource", as used herein, refers to one or more storage media for persisting model information, such as a file on disk.) The storage flexibility of preferred embodiments means that information about a language model can be indirectly stored in a separate file, and links to this information can be programmatically re-established once both models are reloaded (e.g., in memory). The persisted information thus comprises two resources, one containing a pure language model and the other an extension to the language model that could hold, for instance, UI information required by an editor of the language model.

In another aspect of preferred embodiments, addressed in the related application, a feature of the MEF is its ability to recover broken references when the extension and extended models are loaded. For example, it is possible for a user to make a change to the extended model without loading the extension model. The addition of new objects to the extended model may break some references in the extension model (as these references, in their serialized form, are relative to other objects in the extended model). Changes to objects of the extended model may also cause references to break in the extension model. In this aspect, the MEF implements an algorithm that allows the recovery of broken references. In some environments, broken references may occur with some regularity (since, according to preferred embodiments, the extended model has no knowledge of the extension model), and this feature improves robustness of the MEF in such environments.

FIG. 1 provides a class diagram 100 describing the MEF, according to preferred embodiments. This class diagram 100 is depicted in UML notation. UML is well known to those of skill in the art, and a detailed discussion thereof is therefore not deemed necessary to an understanding of the present invention. (UML is a standard of the Object Management Group. For more information, reference may be made to "UML Toolkit", H. Eriksson, M. Penker, published by John Wiley and Sons in 1997.) The following component descriptions pertain to FIG. 1:

ExtensionMap: See reference number 110. In preferred embodiments, this is the root object of an extension model, and it implements the well-known java.util.Map interface. Preferably, each extension model comprises a single instance of ExtensionMap 110, and it holds a list of Extension objects (see, generally, reference number 120, where a single Extension object is depicted). Each ExtensionMap object 110 is uniquely identified by a namespace attribute (see reference number 111) in preferred embodiments, where this namespace is preferably defined by the user (and could be constructed in a number of ways). The namespace preferably defines the extension set type, not the extended model instance itself.

Extension: See reference number 120. In preferred embodiments, an Extension object is created for each extended object in the model being extended, and each of these Extension objects is used to hold two references: one to the object being extended (shown generally at reference number 122) and another to the actual extension object (shown generally at reference number 121). Note that each of these Extension objects points to a unique object in the extended model, as preferred embodiments use only a single Extension object for any object being extended.

Object (extendedObject): See reference number 140. This is the model object being extended, and is contained by the extended model. According to preferred embodiments, this object is created by the user (and may be managed independently of any extensions made thereto).

Object (extensionObject): See reference number 130. This is the extension object created and provided by the user. Its attributes (which, in preferred embodiments, are unknown to the MEF) are set by the user. It is contained by the Extension object (thereby facilitating life cycle management).

Extension objects created using this approach have no dependencies on any particular model. Thus, extension objects may be applied to another model (i.e., reused) without having to modify those objects. Note also that extensions created using embodiments of the present invention do not alter the semantic meaning of the underlying model, and may be used with models that are extensible (such as WSDL) as well as with models that are not. So, for example, user interface information can be defined for editing a WSDL model, and persisted, without introducing user interface concepts into the WSDL model itself. The present invention therefore provides a non-disruptive, non-intrusive model extension mechanism.

According to preferred embodiments, the extension objects can be managed through methods provided by the java.util.Map interface which is implemented by the ExtensionMap object. In the context of this interface, the extended object is preferably the "key" and the extension object is the "value". Thus, the extensions for an object can be retrieved (as discussed in more detail below) by specifying the extended object as a key.

The model depicted in FIG. 1 provides a simple structure to define a relationship between otherwise-unrelated objects. Using this approach, objects of the base (i.e., extended) model can be extended without requiring modifications to that model or its objects. According to preferred embodiments, an implementation of this model is achieved by using the well-known Eclipse Modeling Framework ("EMF"), which will generate an EMF model of the class diagram in FIG. 1. (Preferably, all models discussed herein are loaded into memory as EMF models.) The Java model generated from an EMF model (using built-in EMF functionality) is preferably augmented with a simple user interface, and according to an aspect of preferred embodiments, an algorithm to recover broken references may be provided as well. EMF also allows for simple resource management. (Each of these topics is further described below.)

Referring now to FIGS. 2-7, an example scenario will now be described to further illustrate operation of preferred embodiments.

In this example scenario, an editor is to be designed that will enable designing a car. The editor provides an interface to visually build an instance of a model referred to in the example as "Car", where this instance will describe a particular car's design. Preferably, the car's design is conveyed though an EMF model that describes the properties of a car. Once built, the model is serialized to a file. Preferably, this file is a structured markup language file, such as an Extensible Markup Language ("XML") file. A sample schema to which the serialized file for the car scenario may conform is shown in FIGS. 2A-2B. See, generally, reference number 200. As shown therein at reference number 210, this sample schema indicates that a car designed according to the Car model comprises an Engine, a Body, and a Chassis. The Body is further defined as comprising a Hood and between 2 and 4 Doors. See reference number 220. The Chassis is further defined as comprising between 3 and 4 Wheels (see reference number 230), each of which comprises a Tire and a Rim (see reference number 240).

Figure 3:
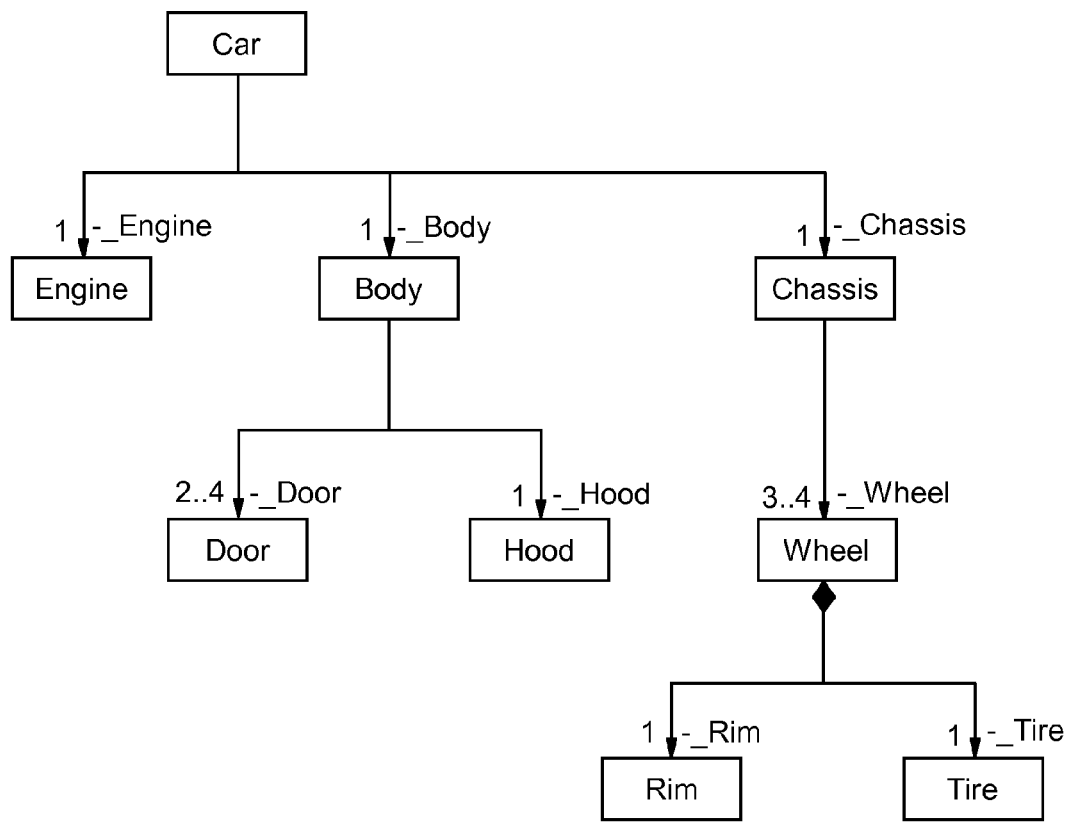
FIG. 3 depicts this sample schema instantiated as an Eclipse Modeling Framework ("EMF") model.

FIG. 3 depicts this schema, as instantiated as an EMF model. The editor is to be provided with a canvas that allows the user to graphically design the instance model. The challenge is for the editor to keep track of where to place the icons representing car components as the user builds the model. The Car model does not provide a facility to store an object's (x,y) coordinates. Therefore, the MEF can be used to extend the Car model objects with an additional object, which in this example is referred to "UIExtension" and which has an "x" field and a "y" field. In the context of the MEF, this UIExtension object becomes the extension object. An instance of the UIExtension object can be attached to any object of the Car model (the extended object) desired, and these instances are then serialized as part of the MEF.

According to preferred embodiments, to extend the Car model, the editor creates an ExtensionMap object (see reference number 110 of FIG. 1, described above) which will keep track of all UIExtension objects pertaining to this extension of the Car model. Preferably, the instance of ExtensionMap is identified by the namespace used in the instance of the Car model being extended. Assume the user opens the editor to create a new Car model instance, and that the following sequence of events then takes place:

1. The user opens a "New Car Model" wizard.
2. The user enters a file name of "new2004design.carmodel". In preferred embodiments, the wizard uses this value to construct a namespace for this instance of the Car model. (For example, a namespace value for this example may be specified in Uniform Resource Identifier format with a protocol identifier, such as "http", followed by "://car.model/new2004design".)
3. The user presses "Finish" on the wizard, which invokes the editor with the information collected.
4. The editor creates a resource for storing the user's new model. In this example, the resource is named "new2004design.carmodel" and initially contains the root object Car.
5. The editor creates a new resource to contain the instance of MEF that will extend the Car model. Suppose that, for this example, the new resource is named "new2004design.uiextension". This resource initially contains the MEF root object ExtensionMap. In preferred embodiments, this resource is chosen by the editor and there are no requirements imposed on this resource as long as the editor can find it when the corresponding extended model resource is subsequently loaded. (Alternatively, the user may be allowed to identify the resource in which the MEF instance will be persisted.)

Figure 4:
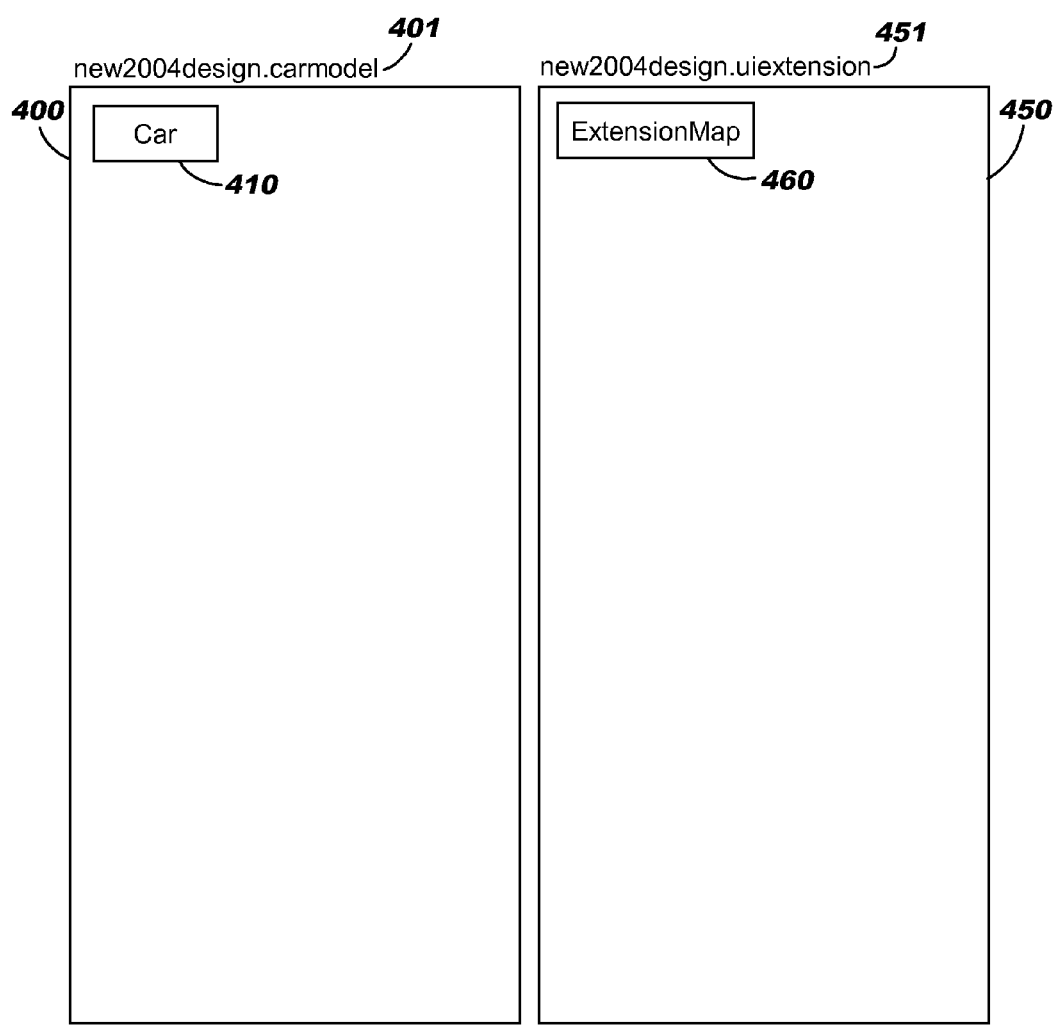
FIG. 4 provides a diagram illustrating an initial version of sample models created when using a preferred embodiment of the present invention, and FIG. 5 provides a diagram showing a later snapshot of these models.

The diagram in FIG. 4 illustrates models 400, 450 that result from executing the steps above. In preferred embodiments, each model—in this example, the Car instance model 400 and MEF instance 450 model—is stored in a separate resource (as illustrated by the box surrounding each model in FIG. 4). The Car instance model 400, using the resource name "new2004design.carmodel" 401, is shown with its initial "Car" object 410, and the MEF instance model 450, using the resource name "new2004design.uiextension" 451, is shown with its initial "ExtensionMap" object 460.

Once the ExtensionMap is created, the editor can extend each Car model object (e.g., as the user creates them). In preferred embodiments, this is done by creating a new instance of UIExtension for each object to be extended, and adding this new instance to the list of extensions maintained in the ExtensionMap object by invoking the put( )method of the java.util.Map interface (which is implemented by ExtensionMap). For instance, the following invocation may be used to record the (x,y) coordinates for a GUI icon representing a car Hood object:

ExtensionMap.put(Hood, UIExtension)

According to preferred embodiments, this call creates a new Extension object, sets its "extendedObject" reference to the Hood object and sets its "extensionObject" reference to the UIExtension object. (Note that when the MEF instance is serialized, the Extension object will contain the UIExtension object and still reference the Hood object.) This new Extension object is also added to the "extensions" list contained by the ExtensionMap object.

Figure 5:
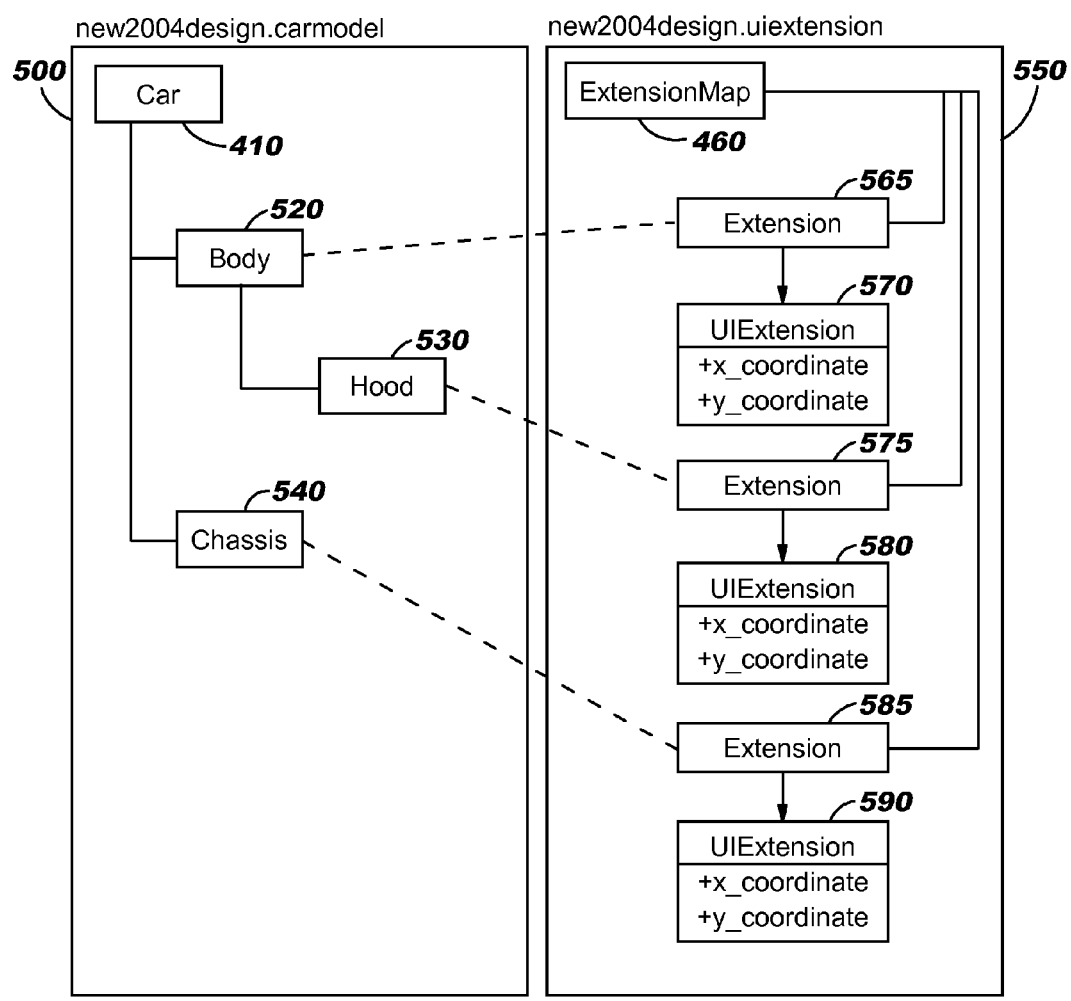

The diagram in FIG. 5 shows a sample snapshot of the two models (Car and MEF) during the development phase. Notice that every component 520, 530, 540 in the Car model 500 has been extended with a corresponding UIExtension object 570, 580, 590 in the MEF model 550. (This example presumes that the root node "Car" 410 is not displayed to the user, and therefore it has not been extended.) This diagram also shows that each Extension object 565, 575, 585 is linked (through a reference) to an extended object and contains its corresponding extension object.

The editor with which the user is designing his Car model will retrieve the UIExtension objects in order to read or update (x,y) coordinates for a given object of that model. For instance, when the user's Car model is loaded, the editor needs to know where the objects were placed on the canvas the last time the user authored this model. As another example, the editor needs to update the (x,y) coordinates in the UIExtension object when the user moves an object to a new location on the canvas. To do this, the ExtensionMap.get (key) method of the java.util.Map interface can be invoked, where the "key" argument is the extended object, thereby returning the extension object. For example, the current (x,y) coordinates specified as an extension for the "Hood" object 530 of the diagram in FIG. 5 can be obtained by invoking ExtensionMap.get(Hood)

and in response, the UIExtension object 580 will be returned.

The contents of two serialized sample resources "new2004design.carmodel" 600 and "new2004design.uiextension" 700 are shown in FIGS. 6 and 7, where these resources correspond to the models 500, 550 in FIG. 5. Note that both models are serialized as XML documents in this example (although this is by way of illustration and not of limitation). As noted earlier, an advantage of using the MEF is that the extension information can be serialized without altering the extended model. Thus, it can be seen that the "Car" model specified in document 600 of FIG. 6 has not been altered to refer to (x,y) coordinates—or to reflect in any way that this model has been extended. Instead, the extension information is wholly contained within document 700 of FIG. 7.

Referring in more detail to document 700, a sample syntax for specifying extensions is shown therein. In this sample syntax, an "<extensions>" element is specified for each extension, and each such element comprises an "<extendedObject>" element and an "<extensionObject>" element. The first such <extensions> element 710 pertains to the (x,y) coordinates for the Body object 520 in FIG. 5, specifying that this object is to be placed at location (10,20) on the GUI canvas. According to this sample syntax, the "href" attribute of the <extendedObject> element identifies the extended object using a notation where the resource in which the extended model is described is specified first, followed by a delimiter (a "#" symbol followed by "//", in this sample syntax) and a variable number of object references that describe a traversal through the hierarchy of the extended model. For example, to identify an extension of the Body object 520, the object reference portion of this href syntax specifies "@body" (see reference number 711); to identify an extension to the Hood object 530, which is a child of the Body object 520 in the model depicted in FIG. 5, the object reference portion of this href syntax specifies "@body/@hood" (see reference number 721). It should be noted that the syntax shown in FIG. 7 is merely one example of the manner in which the extended elements can be identified, and in which the extension elements can be specified. Alternative syntax may be used without deviating from the scope of the present invention.

While this example specifies extensions pertaining to locations of objects on a GUI canvas, it will be obvious that embodiments of the present invention are not limited to these particular extensions. Techniques disclosed herein flexibly adapt to extensions which may be deemed necessary for a particular application with which embodiments of the present invention are used.

Referring again to the MEF structure depicted in class diagram 100 of FIG. 1, the ExtensionMap object 110 of preferred embodiments utilizes not only methods implemented from the java.util.Map interface, but also provides another "convenience" method, referred to herein as "initializeAdapter( )". When implemented, this optional method preferably creates a singleton EMF adapter that implements only the java.util.Map.get(Object) method, which may be used by the user and/or editor to easily look up corresponding extension objects by passing the extended object. (For example, the extended Hood object 530 of FIG. 5 can be passed as a parameter, and in response, the corresponding UIExtension object 580 is returned.) An EMF adapter, in this case, is preferably an object that is attached to the ExtensionMap, where this EMF adapter object lives in memory and is not persisted. It implements a simple interface and may be created when the MEF is initially set up. Similar adapters may also be attached to each extended object to look up the corresponding extension object without having to go through the ExtensionMap. (The adapters thus provide a relatively small, constant look-up overhead, as contrasted to performing an in-order traversal of the list of extensions which are accessible through the ExtensionMap.)

When using an Eclipse (i.e., EMF) implementation of the MEF, an EMF-provided factory method may be used to create and manage ExtensionMap objects belonging to different instances of the MEF. Different instances may arise in several situations. For example, a user may create different sets of extensions to a single base or extended model (such as defining two different cars based on the Car model illustrated by FIG. 3), and each set of extensions may be persisted using a different MEF instance. Or, each set of extensions to a single extended model may be created by a different user (or user group) and then stored in different MEF instances. Furthermore, a single instance of the MEF may contain extensions to more than one model (although this has not been illustrated in the examples provided herein). In addition, it is possible to store several MEFs in a single resource. In this case, each model is preferably identified by a unique instance of ExtensionMap, which can be individualized (for example) by the specification of a unique namespace.

Preferred embodiments store the extensions in a separate resource from that of the model being extended, as has been noted above and depicted in the sample resource files. This resource independence simplifies the MEF and allows for greater flexibility, leaving management of the resources to the user. Furthermore, in preferred embodiments, when the two models are serialized (i.e., when they are not currently loaded in memory), the extended model has no reference to its extension model. Instead, as has been described, the MEF establishes this relationship through its ExtensionMap. Therefore, tools that build and manage an extension model preferably react to the loading of an extended model by also loading the corresponding extension model. On the other hand, loading an extension model first when using such tools preferably causes the referenced extended model to be automatically loaded as well.

In preferred embodiments, references to the extended model from the MEF are automatically created by EMF. In most cases, these references are generated according to their position in the extended model. For example, to reference the first object of a list from the extended model, a reference of "object_name.0" (where "object_name" is replaced by the actual object name) is generated by EMF to refer that object in the extended model.

See also FIG. 7, where sample syntax is provided for expressing references in persisted versions of the extensions. As discussed above with reference to elements 711 and 721, this sample syntax refers to an extended object's hierarchical position within the extended model. The sample in FIG. 7 does not illustrate references to objects that belong to a list. Door objects are one example from the Car model that have multiple occurrences. Thus, for example, if the second of the Door instances was being extended, the href attribute in this example might be expressed as follows:

"new2004design.carmodel#//@body/@door.1"

(It should be noted that while examples depicted herein refer to object references generated by EMF, embodiments of the present invention may also be used advantageously for other types of references, and in particular, those that are based on an object's relative position.)

As discussed briefly above, if users modify an extended model externally without loading the extension model, it may happen that the positions of objects in the extended model are changed, resulting in a mismatch of previously-created references to the extension model (that is, whereby references in the extension model no longer refer to the correct objects in the extended model). To address this situation, an aspect of the present invention (addressed in the related application) provides an algorithm to recover the mismatched references, as will now be described.

In preferred embodiments, the algorithm to recover broken references to the extended model is implemented in the context of WebSphere® Studio Application Developer-Integration Edition ("WSADIE"), enabling the algorithm to leverage functionality provided by WSADIE. WSADIE is a product of International Business Machines Corporation ("IBM"), and "WebSphere" is a registered trademark of IBM in the United States, other countries, or both. WSADIE provides features for working with structured data models generated with EMF. The inventive concepts of the present invention are not limited to this environment, however. As an alternative to using WSADIE, a model may be generated in other ways, and the extensions as disclosed herein may be generated from a UML model corresponding to the MEF description.

The reference recovery algorithm of preferred embodiments also makes use of an EMF utility that is used to compare EMF models and another EMF utility that is used to merge EMF models. These utilities are referred to hereinafter as "the EMF compare utility" and "the EMF merge utility", respectively. Logic which may be used when implementing embodiments of the algorithm will now be described with reference to FIGS. 8 and 9.

Figure 8:
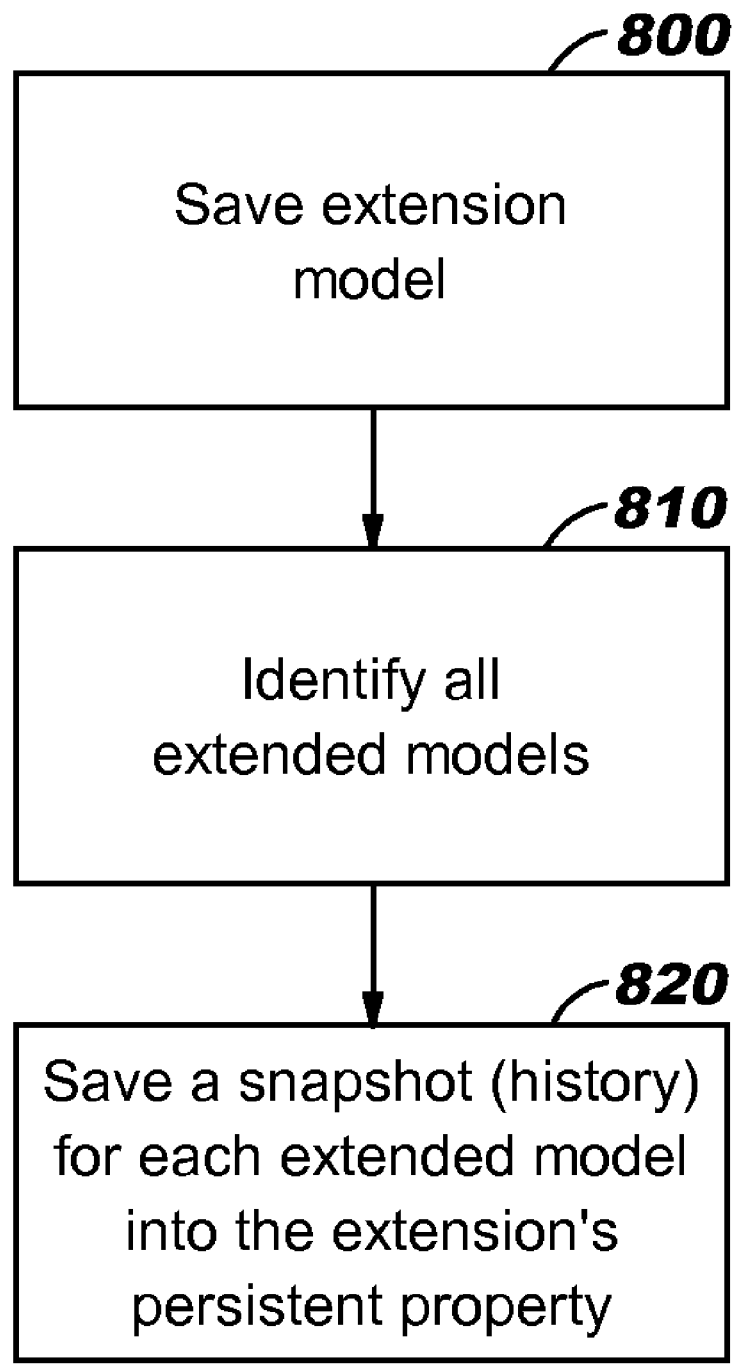

Referring first to FIG. 8, the extensions are persisted (Block 800). Preferably, this comprises saving the extension model to disk. See FIG. 7 for an example of one manner in which the extension model may be persisted. In Block 810, the extended model or models referenced by these extensions is/are identified. Block 820 takes a snapshot for each extended model and saves that snapshot as the persistent property of the extension model resource. According to preferred embodiments, each snapshot captures a point-in-time record of the model structure. As a result, a copy is available of the original extended model(s) to which the extension model correctly refers. See reference number 701 in FIG. 7, where the extended model is identified. (The href attributes at reference numbers 711 and 721 contain references to the structure captured in this snapshot.) Note that the extended model snapshots may be persisted with the extension model in other ways, without deviating from the scope of the present invention.

Subsequently, when it is desired to (re)load an extension model, the recovery algorithm uses information persisted according to FIG. 8 to recover possible broken references. Logic which may be used in recovering the references is shown in FIG. 9, and begins at Block 900 by loading the extended model snapshots that were previously stored in the persistent property of the extension model. In Block 910, the extension model is loaded, based on these extended model snapshots. During the loading, references of the extension model are resolved (Block 920) to point to the correct objects in the original extended models, i.e., to objects in the snapshot models.

Blocks 930-960 represent iterative operations that repeat until processing of all snapshot models is finished. Block 930 loads the latest external version of a particular one of the snapshot models and compares that external version to the snapshot that was persisted, thereby checking to see if the extended model was modified externally. To check if the extended model is different from the version captured in the snapshot, preferred embodiments compare the current (i.e., loaded) version of the extended model to the loaded snapshot model using the EMF compare utility. (This EMF compare utility is provided by implementations of WSADIE, which, as stated earlier, is leveraged by preferred embodiments. In alternative embodiments where WSADIE is not used, the EMF compare utility may be invoked directly.)

Block 940 tests whether the compared models are the same. If both models are the same (i.e., a positive result at Block 940), nothing needs to be done since the extended model has not been changed; thus, as shown in Block 950, the iterative processing of Blocks 930-960 continues with the next (if any) of the snapshot models. If the models are different (i.e., a negative result at Block 940), the recovery algorithm performs revisions (Block 960) so that the extensions reference the correct object in the modified extended model. Preferably, this revision comprises updating the snapshot model to make it the same as the current version of the extended model. Preferred embodiments perform the update by invoking the EMF merge utility to merge the differences into the snapshot model. (As with the EMF compare utility, this EMF merge utility is also provided by WSADIE, but may be invoked directly in alternative environments.)

In preferred embodiments, the merge utility performs a series of update/add/remove operations generated by the EMF compare utility. Each operation accomplishes one of the following: (1) updates an attribute of a model object; (2) adds a new model object; or (3) removes an object from the snapshot model. If the current version of the extended object model indicates that an attribute of a model object needs to be updated, preferred embodiments simply change the value of this attribute. If the current version of the extended object model indicates that an object has been added, then there are no previously-existing extensions for that object (because it was not present when the extensions were created), and thus preferred embodiments simply add this object to the snapshot model as well. If the current version of the extended object model indicates that an object has been removed, and if that object is referenced by the extension model (that is, if a now-removed object had previously been extended), the recovery algorithm of preferred embodiments deletes this reference from the extensions as well as deleting the object itself from the snapshot model, since the reference will no longer be valid.

After the merge completes, the snapshot model will be identical to the current version of the extended model. Since the extension model references the snapshot model, the extension model will continue to reference the correct objects in the snapshot model after the snapshot model has been transformed to match this current version of the extended model. As a result, the extension model is correctly referencing the latest extended model, since the snapshot model is now exactly the same as the extended model.

The compare and merge procedure described with reference to Blocks 930-960 will be performed for each snapshot model, so that each model becomes up-to-date. As the recovery algorithm completes, any temporary resources used for the recovery may be deleted. The extension model and/or extended model may then be rendered to the user.

After the user finishes interacting with the model further (e.g., to add or change extensions), the extension model (with all references having been programmatically recovered to correctly point to the current extended model or models) and the corresponding snapshot model(s) are preferably serialized as has been discussed with reference to FIG. 8. As a result, the newly-serialized version of the extension model is correctly referencing the most-recent version of the extended model(s). (Note also that each snapshot model serialized at this time will also reflect the most-recent version of the extended model for which it provides a snapshot.)

Thus, it can be seen that use of embodiments of the present invention enables extending models for which an extension facility has not been provided, and for models which are extensible, the non-intrusive, non-disruptive approach of preferred embodiments may be advantageous over the model's existing extension mechanism. In aspects where the recovery algorithm addressed in the related application is implemented, the present invention also enables programmatically resolving broken references between an extension model and the underlying extended model. No requirement is placed on an extended model for referencing its extensions, or for indicating that is has been extended. In addition, extensions created using embodiments of the present invention may be reused.

As will be appreciated by one of skill in the art, embodiments of the present invention may be provided as (for example) methods, systems, and/or computer program products. The present invention may take the form of an entirely hardware embodiment, an entirely software embodiment, or an embodiment combining software and hardware aspects.

Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute using the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A system for extending objects of an object model, comprising:
   a computer comprising a processor; and
   instructions which are executable, using the processor, to implement functions comprising:
      creating, for the object model, a corresponding extension model, wherein the extension model is distinct from the object model and initially comprises a root node that identifies the object model and an adapter method;
      creating, for each of the objects of the object model, a corresponding extension object that specifies at least one extension to that object of the object model and that provides a link to that object of the object model, wherein:
         the extension objects comprise a list of child objects of the root node;
         the adapter method accepts, as input, any selected one of the objects of the object model and returns, as output, the specified at least one extension from the extension object corresponding to the selected one of the objects;
         the object model defines no reference to the extension model; and
         the objects of the object model define no reference to the corresponding extension objects; and
      persisting the extension model and the object model separately.

2. The system according to claim 1, wherein the functions further comprise:
   subsequently reloading the persisted object model and the persisted extension model; and
   determining, for each one of the objects of the reloaded object model, each of the at least one extension to that one of the objects by passing, as the input to the adapter method, that one of the objects and receiving, as the output from the adapter method, the specified at least one extension from the extension object corresponding to that one of the objects.

3. The system according to claim 1, wherein the functions further comprise:
   editing the object model, prior to the persisting, using a graphical editor;
   specifying, as one of the at least one extension in each of the extension objects prior to the persisting, a location where a visual representation of the object which corresponds to the extension object is positioned when displayed on a graphical user interface by the graphical editor;
   subsequently reloading the persisted object model and the persisted extension model for use with the graphical editor;
   determining where to position the visual representation of each one of the objects of the reloaded object model for displaying on the graphical user interface, further comprising:
      passing, as the input to the adapter method, that one of the objects and receiving, as the output from the adapter method, each of the specified at least one extension from the extension object corresponding to that one of the objects; and
      obtaining, from the output, the specified location for that one of the objects; and
   positioning the visual representation of each one of the objects of the reloaded object model at the obtained location, thereby restoring the graphical user interface as displayed prior to the persisting and the subsequently reloading.

4. A computer program product for extending objects of an object model, the computer program product embodied on one or more non-transitory computer-readable storage media and comprising computer-readable program code for:
   creating, for the object model, a corresponding extension model, wherein the extension model is distinct from the object model and initially comprises a root node that identifies the object model and an adapter method;
   creating, for each of the objects of the object model, a corresponding extension object that specifies at least one extension to that object of the object model and that provides a link to that object of the object model, wherein:
      the extension objects comprise a list of child objects of the root node;
      the adapter method accepts, as input, any selected one of the objects of the object model and returns, as output, the specified at least one extension from the extension object corresponding to the selected one of the objects;

the object model defines no reference to the extension model; and the objects of the object model define no reference to the corresponding extension objects; and persisting the extension model and the object model separately.

5. The computer program product according to claim 4, further comprising computer-readable program code for:

subsequently reloading the persisted object model and the persisted extension model; and determining, for each one of the objects of the reloaded object model, each of the at least one extension to that one of the objects by passing, as the input to the adapter method, that one of the objects and receiving, as the output from the adapter method, the specified at least one extension from the extension object corresponding to that one of the objects.

6. The computer program product according to claim 4, further comprising computer-readable program code for:

editing the object model, prior to the persisting, using a graphical editor;

specifying, as one of the at least one extension in each of the extension objects prior to the persisting, a location where a visual representation of the object which corresponds to the extension object is positioned when displayed on a graphical user interface by the graphical editor;

subsequently reloading the persisted object model and the persisted extension model for use with the graphical editor;

determining where to position the visual representation of each one of the objects of the reloaded object model for displaying on the graphical user interface, further comprising:

passing, as the input to the adapter method, that one of the objects and receiving, as the output from the adapter method, each of the specified at least one extension from the extension object corresponding to that one of the objects; and obtaining, from the output, the specified location for that one of the objects; and positioning the visual representation of each one of the objects of the reloaded object model at the obtained location, thereby restoring the graphical user interface as displayed prior to the persisting and the subsequently reloading.

* * * * *